March 31. 1925.                            1,532,052
A. E. GREENE
TREATMENT OF IRON OR STEEL IN ELECTRIC FURNACES
Filed Jan. 2, 1909
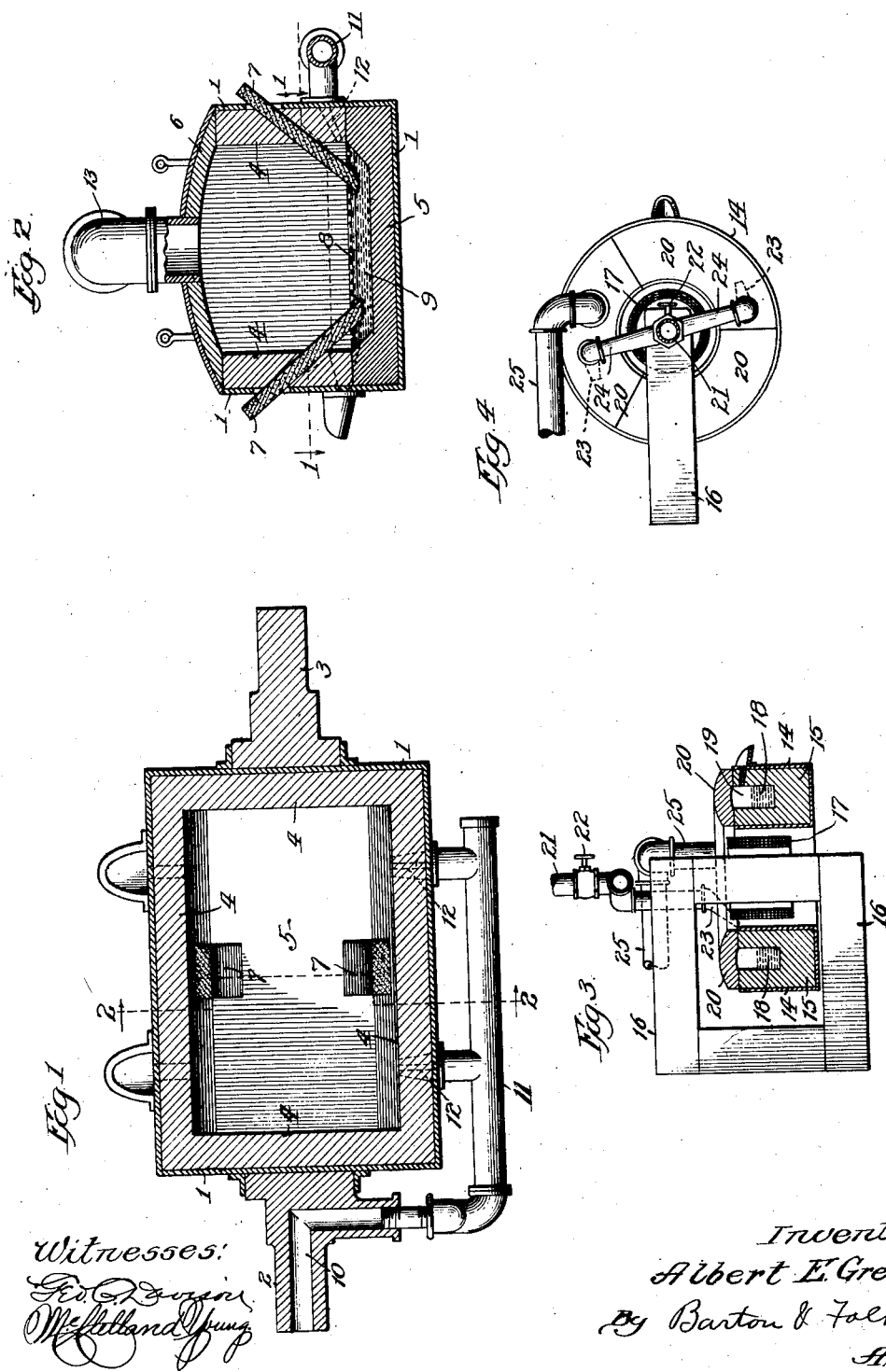

Patented Mar. 31, 1925.

1,532,052

UNITED STATES PATENT OFFICE.

ALBERT E. GREENE, OF CHICAGO, ILLINOIS, ASSIGNOR TO AMERICAN ELECTRIC SMELTING AND ENGINEERING COMPANY, OF ST. LOUIS, MISSOURI, A CORPORATION OF MISSOURI.

TREATMENT OF IRON OR STEEL IN ELECTRIC FURNACES.

Application filed January 2, 1909. Serial No. 470,366.

*To all whom it may concern:*

Be it known that I, ALBERT E. GREENE, a citizen of the United States, residing at Chicago, in the county of Cook and State of Illinois, have invented a certain new and useful Improvement in the Treatment of Iron or Steel in Electric Furnaces, of which the following is a full, clear, concise, and exact description.

My present invention relates to improvements in metallurgical processes and more particularly to the treatment of iron or steel in electric furnaces. The invention has for its object the provision of an improved electric furnace process for treating iron or steel in the course of which impurities, such as sulfur, phosphorous and oxygen, are removed therefrom, principally as a slag, either singly or together, and in such manner as to leave the iron or steel in a purified and deoxidized condition.

In the making or refining of steel in electric furnaces prior to this invention, the usual method has been to make the lining or hearth of the furnace of basic material, such as burnt magnesite or dolomite, the roof being of silica brick. The slag used has been highly basic, containing—say about 15 percent of silica, and requiring a considerable addition—say 30 percent of fluorspar to act as a flux. The temperature attainable in the electric furnace is sufficiently high to melt a slag of extreme basicity, and the fumes from the highly basic slags heretofore generally used have a strong corrosive action on the silica of the roof, so that the latter requires renewing at frequent intervals resulting in considerable expense and very serious delays in the operation of the electric furnace. The fluorspar which becomes volatilized has the same corrosive effect on the roof and this material furthermore is quite expensive. The chief reason for using a slag so highly basic has been to reduce to a minimum the sulfur content of the product. I have found, however, that by using a slag containing a comparatively high percentage of silica, the sulfur content of the metal may be reduced to practically the same extent as before and considerable economies are effected in the operating of the furnace and also an improvement secured in the quality of the steel produced.

My invention, accordingly, involves treating iron of steel in a basic electric furnace by applying thereto a slag comprising lime and silica approximately in such proportions as to form a neutral mixture, that is, a mixture that is neither strongly acid nor strongly basic, and maintaining the metal and slag molten under reducing conditions. The actual percentage of silica in the slag will vary considerably for different materials and circumstances, but will generally be between 25 and 35 per cent of the total weight of the slag. Appropriate reducing conditions may be obtained in various ways, as, for example, by the use of suitable carbonaceous reducing agents, such as a gaseous reducing agent acting on the surface of the charge in the furnace. Such reducing conditions, as contemplated by the invention, ensure the reduction of any iron oxide in the slag thereby producing conditions more favorable for the taking up by the slag of phosphorous and sulfur, or either of them.

The essential feature of the improved process of my present invention is the production in a molten bath of iron or steel of conditions favorable for the separation therefrom of phosphorous and sulfur, or either of them, by combination with slag-forming constituents, such as lime and silica, the phosphorous or sulfur compound thus formed floating on top of the molten bath and being removed in the usual manner as a slag. The production of conditions favorable for accomplishing these results is attained by maintaining the molten metal and slag at a temperature at which the phosphorous or sulfur, or both, will combine with the slag-forming constituents present, the quantity of silica present being such that the slag is neither strongly acid nor strongly basic, and by establishing and maintaining suitable reducing conditions.

Thus, the present invention involves regulating, by an electric current, the temperature of a bath of molten iron or steel, covered by a fluid slag comprising lime and silica, and meanwhile acting upon the bath with a reducing agent, such as a carbonaceous gaseous reducing agent, for example, carbon monoxide.

Under such conditions, it appears that the lime in the flux is reduced thereby providing calcium which combines with sulfur to form calcium sulfide, or with phosphorous possibly forming calcium phosphide, respectively. In any event, the combined action of the reducing agent and the fluid lime-silica slag produces conditions favorable for the taking up by the slag of either or both phosphorous and sulfur.

In carrying out the invention, the reducing action and the presence of suitable fluxing agents for forming a fluid lime-silica slag are essential. I have obtained the desired reducing action by blowing a gaseous reducing agent such as carbon monoxide upon the surface of the molten slag covering the molten metal. The necessary reducing action may be obtained in various other ways apparent to those skilled in the art. The carbon of the electrodes in an arc furnace contributes towards the production of the necessary reducing conditions. Without the influence of a reducing action acting on the bath, the separation of phosphorous or sulfur, as contemplated by the invention, is not assured or practicable. It is, however, important that the reducing conditions be controlled. Under the reducing conditions contemplated by my present invention, silica in the slag may be reduced, and the resulting silicon, on account of its high affinity for oxygen, probably materially aids in insuring reducing conditions. At any rate reduction of silica is insurance that reducing conditions have been maintained.

An important feature of the present invention resides in the modification of the heretofore customary highly basic slag by the addition of a relatively high percentage of silica, thereby giving the slag a considerably lower melting point, rendering it more fluid and facilitating its refining action. This feature results in a very material saving in electrical energy over what would be required to melt a straight lime or highly basic slag. I have found, notwithstanding the presence of silica in the slag in sufficient quantity to render it fluid, that the effectiveness of such a slag in removing sulfur from the metal is not substantially lessened and the sulfur may be separated from the steel to practically the same extent as with the heretofore customary highly basic slags. By making the slag fluid by means of silica, in accordance with the present invention, it is possible to pour the slag directly from the furnace instead of having to rake it out as may be necessary with the heretofore customary highly basic slags, or instead of using considerable quantities of fluorspar at an unnecessary expense.

While the process of my invention is not dependent upon the use of any particular type of electric furnace, I have in the accompanying drawings illustrated two types of furnace suitable for practicing the invention. In the drawings—

Fig. 1 is a sectional view of an electric furnace on the line 1—1 of Fig. 2, showing one type of furnace with which my invention may be practiced;

Fig. 2 is a sectional view on the line 2—2 of Fig. 1;

Fig. 3 is a vertical section of an induction furnace with which the process may be practiced; and Fig. 4 is a plan view of the furnace shown in Fig. 3.

Similar reference characters are used to designate similar parts wherever shown.

Referring to Figs. 1 and 2 the steel casing 1 of the furnace is supported from trunnions 2 and 3, in order that the furnace may be tilted in the usual manner. The side walls 4 are of refractory material and the crucible 5 is provided with a basic lining. The furnace is provided with a removable top 6 of silica or other suitable material.

Electrodes 7 extend through the walls of the furnace and dip into the slag 8. By tilting the furnace the amount of electrode in the slag may be regulated or it can be kept out of the slag. When the electrodes dip in the slag a current of low voltage and high amperage is preferably employed, and the current may be regulated by varying the voltage. Either direct or alternating current may be employed. One electrode may be caused to make contact with the metal 9 where desired. The trunnion 2 is hollow to provide a passage 10 communicating with the tuyère pipe 11. Tuyères 12 extend downward through the wall 4 (see Fig. 2). The reducing gas is introduced under pressure through the passage 10 to the tuyères 12 in any suitable way and at any desirable pressure. The tuyères are inclined downward in order that the gas may come into more thorough contact with the bath. The gas may be blown into the bath or it may be blown into the furnace chamber from above the charge at any suitable place so as to insure contact of the gas with the slag. It is to be noted that the gas entering the highly heated chamber will, if colder than the gas it displaces, spread itself out at the lowest possible level next above the bath by reason of its higher specific gravity than the gas it displaces.

The exhaust gas is preferably let out through the exhaust pipe 13, and such gas may be collected on account of its value.

Figs. 3 and 4 show a well known type of induction furnace. The steel casing thereof may be supported in any suitable manner. The refractory walls 15 enclosed in the casing are annular in shape and surround one leg of the transformer core 16. The core is wound with one or more coils 17.

which serve as the primary of the transformer, the secondary thereof consisting of the metallic bath 18 contained in the furnace chamber 19. The chamber 19 is provided with a cover, which is preferably made in a plurality of sections 20. Gas is admitted to the furnace chamber 19 from the gas main 21 and the flow thereof is controlled by the valve 22. Tuyeres 23, which are connected by means of pipe 24 with the gas main, extend through the cover 20. The exhaust gasses pass out through the exhaust pipe 25.

In practice, I prefer to use an electric furnace of the types described, or of any other suitable type, for the reason that the fluxes may thereby be readily melted and the temperature of the bath may be regulated and controlled.

Lime is a flux which readily combines with sulfur and under certain conditions with phosphorous. I have found that sulfur may be removed from pig iron to less than 0.005 percent by adding lime to a bath of pig iron, maintaining the metal and slag in a molten condition at a temperature approximately of 1325° C., and by blowing the bath maintained at such temperature with a reducing gas containing 23 percent by volume of carbon monoxide (CO), the remaining content of the gas being non-oxidizing. To maintain the slag fluid at such a low temperature, it is necessary that it contain more than 15 percent of silica.

To remove phosphorous as a slag at such relatively low temperature, it is necessary to have a more fluid slag than is required for sulfur removal. The slag may contain as much as 30 percent of silica and at a temperature of approximately 1400° C., the aforementioned gaseous mixture containing about 23 percent by volume of carbon monoxide (CO) will give a satisfactory elimination of both (or either) phosphorous and sulfur from the iron or steel under treatment.

Slags in certain cases may contain metallic oxides, such as iron oxide, and in the case of Bessemer and open-hearth metal this is invariably the case. After the metal has been treated in the Bessemer converter or the open-hearth furnace, it may be further treated in an electric furnace by the process of this invention, in which case the reducing agent acting upon the molten bath causes the reduction of the iron oxides of the slag, thus recovering the iron and also removing conditions which are detrimental to the removal of sulfur and phosphorous from the metal.

As hereinbefore stated, the reducing agent employed in practicing the improved process of the invention is adapted to act as a reducing agent with respect to the flux (or slag) and incidentally with respect to the metallic oxides of the slag. In the practice of the invention I have secured satisfactory results by the use of carbonaceous gaseous reducing agents. Carbon monoxide is such a gaseous agent. In practice, I have also found that the gases from certain blast furnaces, especially if the gas contains a large amount of carbon monoxide, may be employed, with satisfactory results, to produce in the slag conditions favorable for the removal of phosphorous and sulfur. For example, stack furnace gas, containing 22 percent by volume of carbon monoxide (CO) and 12 percent by volume of carbon dioxide ($CO_2$), acts in a satisfactory manner as a reducing agent for the flux and accompanying slag in practicing my present invention. Producer gas, which consists largely of carbon monoxide, gases containing a large percentage of hydrogen or methane ($CH_4$), and the like, may also be used in carrying out the invention.

The process of the invention is of particular advantage in the manufacture of soft or low carbon steel. The greater or less quantity of nascent silicon which enters the bath serves to purify it and in a way to make up in purifying effect for the lack of carbon in the bath. The silica in the slag may be so proportioned that the quantity of nascent silicon which enters the bath shall be only sufficient to have a purifying effect and shall not be sufficient to leave any appreciable percentage of silicon in the finished product.

I claim:

1. The method of treating iron or steel which consist in applying thereto a slag comprising lime and silica and maintaining the metal and slag molten on a basic hearth in an electric furnace, the quantity of silica being about 25 to 35 percent. of the total weight of the slag.

2. The method of treating iron or steel which consists in applying thereto a slag comprising lime and silica and maintaining the metal and slag molten on a basic hearth in an electric furnace, the lime and silica being approximately in such proportions as to form a neutral mixture, that is, a mixture which is neither strongly acid nor strongly basic.

3. The method of treating iron or steel which consists in applying thereto a slag comprising lime and silica and maintaining the metal and slag molten on a basic hearth in an electric furnace, the percentage of silica in the slag being sufficient to practically avoid formation of fumes of lime in the furnace.

4. In the making of soft or low carbon steel the method which consists in applying to the bath a slag comprising lime and silica and maintaining the metal and slag molten on a basic hearth in an electric furnace, the percentage of silica in the slag being so high that silicon is reduced therefrom and enters the bath in nascent condition.

5. In the making of soft or low carbon steel the method which consists in applying to the bath a slag comprising lime and silica and maintaining the metal and slag molten on a basic hearth in an electric furnace, the percentage of silica in the slag being so high that silicon is reduced therefrom and enters the bath in nascent condition in sufficient quantity to remove impurities to a substantial extent but not in sufficient quantity to appear in an appreciable percentage in the finished product.

6. The method of treating iron or steel which consists in applying thereto a slag comprising lime and silica and maintaining the metal and slag molten on a basic hearth in an electric furnace under reducing conditions, the quantity of silica being about 25 to 35 per cent of the total weight of the slag.

7. The method of treating iron or steel which consists in applying thereto a slag comprising lime and silica and maintaining the metal and slag molten on a basic hearth in an electric furnace under reducing conditions, the lime and silica being approximately in such proportions as to form a neutral mixture, that is, a mixture which is neither strongly acid nor strongly basic.

8. The method of treating iron or steel which consists in applying thereto a slag comprising lime and silica and maintaining the metal and slag molten on a basic hearth in an electric furnace while subjected to the action of a reducing agent, the percentage of silica in the slag being sufficient to practically avoid formation of fumes of lime in the furnace.

9. The method of treating iron or steel which consists in applying thereto a slag comprising lime and silica and maintaining the metal and slag molten on a basic hearth in an electric furnace under reducing conditions, the percentage of silica in the slag being so high that silicon is reduced therefrom and enters the molten bath in nascent condition.

10. The method of treating iron or steel, which consists in applying thereto a slag comprising lime and silica and maintaining the metal and slag molten on a basic hearth in an electric furnace while subjected to the action of a reducing agent, the percentage of silica in the slag being so high that silicon is reduced therefrom and enters the molten bath in nascent condition in sufficient quantity to remove impurities to a substantial extent but not in sufficient quantity to appear in an appreciable percentage in the finished product.

In witness whereof, I, hereunto subscribe my name this thirtieth day of December, A. D., 1908.

ALBERT E. GREENE.

Witnesses:
 GEORGE E. FOLK,
 ALFRED H. MOORE.